United States Patent
Lee et al.

(10) Patent No.: US 9,231,502 B2
(45) Date of Patent: Jan. 5, 2016

(54) MOTOR CONTROL SYSTEM AND FAN APPLY THERETO

(75) Inventors: Kuan-Ting Lee, Taoyuan Hsien (TW);
Ming-Yen Lin, Taoyuan Hsien (TW);
Yu-Liang Lin, Taoyuan Hsien (TW);
Wen-Chih Wang, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 168 days.

(21) Appl. No.: 13/237,948

(22) Filed: Sep. 21, 2011

(65) Prior Publication Data
US 2012/0242269 A1    Sep. 27, 2012

(30) Foreign Application Priority Data
Mar. 23, 2011 (TW) .............................. 100109811 A

(51) Int. Cl.
G05B 11/28    (2006.01)
H02P 6/00     (2006.01)
H02P 6/16     (2006.01)

(52) U.S. Cl.
CPC ............... *H02P 6/002* (2013.01); *H02P 6/008* (2013.01); *H02P 6/16* (2013.01)

(58) Field of Classification Search
USPC ............... 318/400.17, 400.2, 245, 254.1, 599
See application file for complete search history.

(56) References Cited

U.S. PATENT DOCUMENTS

| | | | |
|---|---|---|---|
| 2009/0322262 A1* | 12/2009 | Tobari et al. | 318/400.02 |
| 2010/0181951 A1* | 7/2010 | Noie | H02P 6/20 318/400.11 |

FOREIGN PATENT DOCUMENTS

| | | |
|---|---|---|
| TW | 200633360 A | 9/2006 |
| TW | I282210 B | 6/2007 |

\* cited by examiner

*Primary Examiner* — Eduardo Colon Santana
*Assistant Examiner* — Iftekhar Mustafa
(74) *Attorney, Agent, or Firm* — CKC & Partners Co., Ltd.

(57) ABSTRACT

A motor control system includes a voltage regulating module, an auxiliary activating module, and a drive module. The voltage regulating module is operable to receive a voltage and generate an electrical level regulated voltage by regulating the voltage. The auxiliary activating module is operable to generate a constant duty cycle signal and output the constant duty cycle signal for a period. The drive module is operable to receive the electrical level regulated voltage and the constant duty cycle signal, and control a motor based on the electrical level regulated voltage and the constant duty signal. Also, the present invention also discloses a fan which is applied to the above-mentioned motor control system.

4 Claims, 14 Drawing Sheets

MOTOR CONTROL SYSTEM AND FAN APPLY THERETO

RELATED APPLICATIONS

This application claims priority to Taiwan Application Serial Number 100109811, filed Mar. 23, 2011, which is herein incorporated by reference.

BACKGROUND

1. Field of Invention

The embodiment of the present invention relates generally to a control system and more particularly to a motor control system and a fan applied thereto.

2. Description of Related Art

When 5V and 12V motors are used in low rotational speed, the DCR cannot be increased by coil winding to lower the rotational speed for conforming to the demand standards due to the coil winding space being limited, wherein it is more difficult in 12V motor owing to it being easy to break the wire during manufacturing process in the condition of the wire being extremely thin. As such, the way to lower the rotational speed presently is to connect a resistor with the Vcc terminal of the motor control system in series so that the voltage provided to the IC can be lower to satisfy the demand of the client; however, there is a risk that the motor may be not activated.

In addition, if there is a demand for two kinds of rotational speeds, the prior art has to create two different current paths with switches to produce two different supply voltages for generating two rotational speeds; however, there will be additional power consumption produced from the resistor in the current path results in it being difficult to activate the motor. As such, the motor has to be drove in a high rotational speed when the motor is activated, and the motor is switched to a low rotational speed after the motor is activated. There will be a large noise during the activation of the motor.

In view of the above, the existing apparatus still has obvious inconvenience and defects and needs further improvement. In order to solve the above problems, those skilled in the art are trying hard to find a solution, but no applicable method is put forward. Therefore, it is one of important subjects and also a purpose in need of improvement that how to improve the power consumption due to cascade resistor, and the reduction of voltage provided to IC because of resistors connected in series so as to fail in conforming to the standards of the IC. Furthermore, it is important that how to improve insufficient energy outputted from the IC owing to the drop of the voltage so as to fail in activating the motor, and the large noise when activating the motor.

SUMMARY

A motor control system is provided so as to improve the power consumption due to cascade resistor, and the reduction of voltage provided to IC because of resistors connected in series so as to fail in conforming to the standards of the IC. Furthermore, it is important that how to improve insufficient energy outputted from the IC owing to the drop of the voltage so as to fail in activating the motor, and the large noise when activating the motor.

Thus, one aspect of the embodiment of the present invention is to provide a motor control system. The motor control system includes a voltage regulating module, an auxiliary activating module and a drive module. The voltage regulating module is operable to receive a voltage and perform a regulation process to the voltage to generate an electrical level regulated voltage. The auxiliary activating module is operable to generate a constant duty cycle signal and output the constant duty cycle signal in a predetermined period. The drive module is operable to receive the electrical level regulated voltage and the constant duty cycle signal to control a motor according to the electrical level regulated voltage and the constant duty cycle signal.

In one embodiment of the present invention, the drive module includes a pulse generating unit, a rotational speed control unit and a drive unit. The pulse generating unit is operable to generate a triangle wave. The rotational speed control unit is operable to receive the electrical level regulated voltage and the triangle wave and compare the electrical level regulated voltage and the triangle wave to generate a pulse width modulation control signal. The drive unit is operable to receive the pulse width modulation control signal and the constant duty cycle signal to control the motor.

In another embodiment of the present invention, the voltage regulating module includes a plurality of voltage regulating units, wherein the voltage regulating units are operable to receive the voltage and perform a regulation process to the voltage to generate a plurality of electrical level regulated voltages; wherein the rotational speed control unit is operable to receive the electrical level regulated voltages and the triangle wave and compare the electrical level regulated voltages and the triangle wave to generate the pulse width modulation control signal.

In another aspect of the embodiment of the present invention is to provide a fan. The fan includes a motor and a motor control system. The motor control system includes a voltage regulating module, an auxiliary activating module and a drive module. The voltage regulating module is operable to receive a voltage and perform a regulation process to the voltage to generate an electrical level regulated voltage. The auxiliary activating module is operable to generate a constant duty cycle signal and output the constant duty cycle signal in a predetermined period. The drive module is operable to receive the electrical level regulated voltage and the constant duty cycle signal to control the motor according to the electrical level regulated voltage and the constant duty cycle signal.

In one embodiment of the present invention, the drive module includes a pulse generating unit, a rotational speed control unit and a drive unit. The pulse generating unit is operable to generate a triangle wave. The rotational speed control unit is operable to receive the electrical level regulated voltage and the triangle wave and compare the electrical level regulated voltage and the triangle wave to generate a pulse width modulation control signal. The drive unit is operable to receive the pulse width modulation control signal and the constant duty cycle signal to control the motor.

In another embodiment of the present invention, the voltage regulating module includes a plurality of voltage regulating units, wherein the voltage regulating units are operable to receive the voltage and perform a regulation process to the voltage to generate a plurality of electrical level regulated voltages; wherein the rotational speed control unit is operable to receive the electrical level regulated voltages and the triangle wave and compare the electrical level regulated voltages and the triangle wave to generate the pulse width modulation control signal.

In yet another aspect of the embodiment of the present invention is to provide a motor control system. The motor control system includes a pulse width modulation control signal generating module, an auxiliary activating module and a drive module. The pulse width modulation control signal generating module is operable to generate a pulse width modulation control signal. The auxiliary activating module is operable to generate a constant duty cycle signal and output the constant duty cycle signal in a predetermined period. The drive module is operable to receive the pulse width modulation control signal and the constant duty cycle signal to control a motor according to the pulse width modulation control signal and the constant duty cycle signal.

In one embodiment of the present invention, the pulse width modulation control signal generating module includes a voltage regulating module, a pulse generating unit and a rotational speed control unit. The voltage regulating module is operable to receive a voltage and perform a regulation process to the voltage to generate an electrical level regulated voltage. The pulse generating unit is operable to generate a triangle wave. The rotational speed control unit is operable to receive the electrical level regulated voltage and the triangle wave and compare the electrical level regulated voltage and the triangle wave to generate the pulse width modulation control signal.

In another embodiment of the present invention, the voltage regulating module includes a plurality of voltage regulating units, wherein the voltage regulating units are operable to receive the voltage and perform a regulation process to the voltage to generate a plurality of electrical level regulated voltages; wherein the rotational speed control unit is operable to receive the electrical level regulated voltages and the triangle wave and compare the electrical level regulated voltages and the triangle wave to generate the pulse width modulation control signal.

In still another aspect of the embodiment of the present invention is to provide a fan. The fan includes a motor and a motor control system. The motor control system includes a pulse width modulation control signal generating module, an auxiliary activating module and a drive module. The pulse width modulation control signal generating module is operable to generate a pulse width modulation control signal. The auxiliary activating module is operable to generate a constant duty cycle signal and output the constant duty cycle signal in a predetermined period. The drive module is operable to receive the pulse width modulation control signal and the constant duty cycle signal to control the motor according to the pulse width modulation control signal and the constant duty cycle signal.

In one embodiment of the present invention, the pulse width modulation control signal generating module include a voltage regulating module, a pulse generating unit and a rotational speed control unit. The voltage regulating module is operable to receive a voltage and perform a regulation process to the voltage to generate an electrical level regulated voltage. The pulse generating unit is operable to generate a triangle wave. The rotational speed control unit is operable to receive the electrical level regulated voltage and the triangle wave and compare the electrical level regulated voltage and the triangle wave to generate the pulse width modulation control signal.

In another embodiment of the present invention, the voltage regulating module includes a plurality of voltage regulating unit, wherein the voltage regulating units are operable to receive the voltage and perform a regulation process to the voltage to generate a plurality of electrical level regulated voltages; wherein the rotational speed control unit is operable to receive the electrical level regulated voltages and the triangle wave and compare the electrical level regulated voltages and the triangle wave to generate the pulse width modulation control signal.

In summary, the embodiments of the present invention provide the motor control system, so as to improve the power consumption due to cascade resistor, and the reduction of voltage provided to IC because of resistors connected in series so as to fail in conforming to the standards of the IC. The motor control system is also operable to improve insufficient energy outputted from the IC owing to the drop of the voltage so as to fail in activating the motor, and the large noise when activating the motor by adopting multi-segment rotational speeds.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
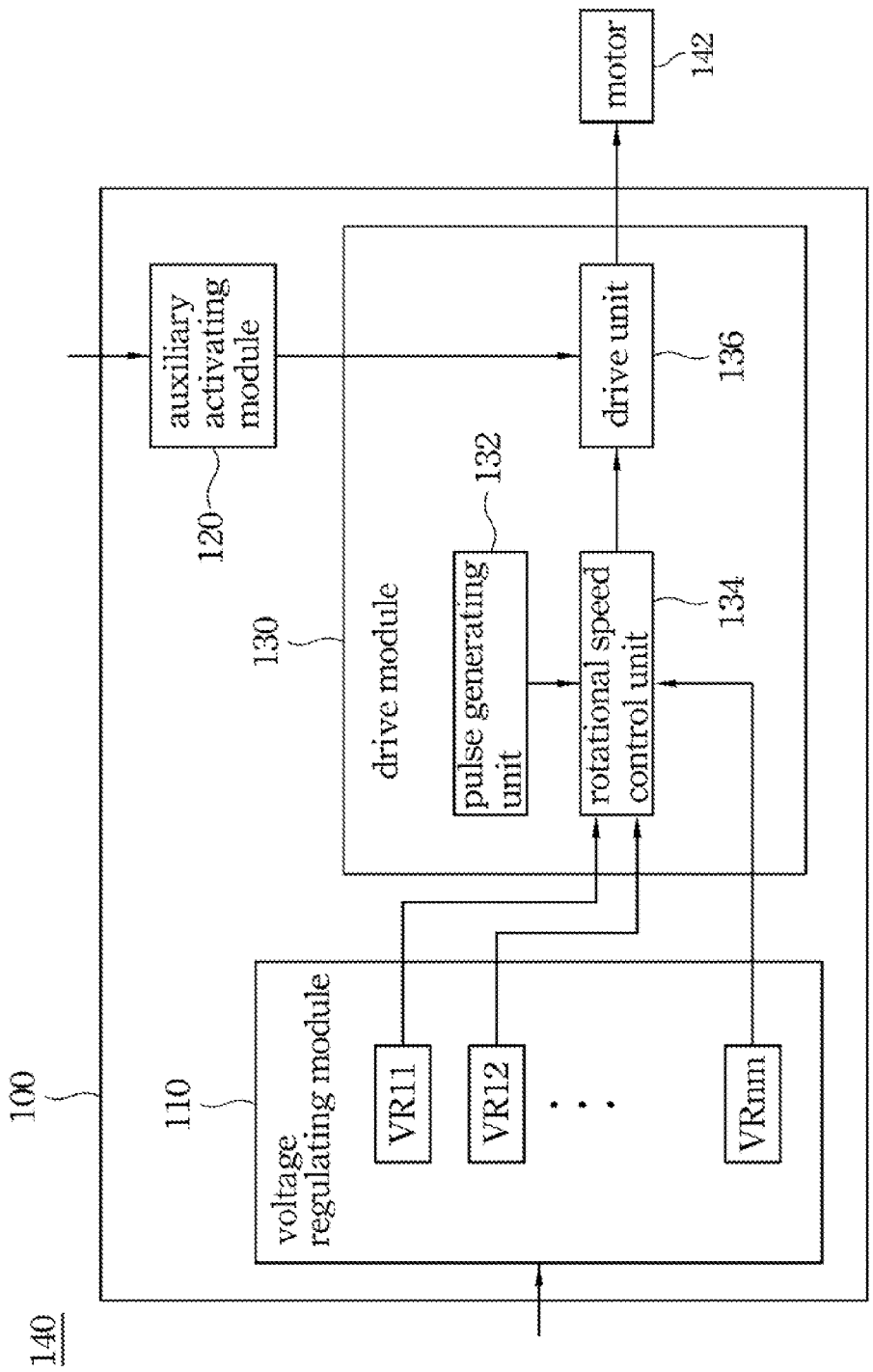
FIG. 1 schematically shows a circuit diagram of a fan including a motor control system according to a first embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

FIG. 1 schematically shows a circuit diagram of a fan 140 including a motor control system 100 according to the first embodiment of the present invention. As shown in FIG. 1, the motor control system 100 includes a voltage regulating module 110, an auxiliary activating module 120, and a drive module 130.

In operation, the voltage regulating module 110 is operable to receive a voltage and perform a regulation process to the voltage to generate an electrical level regulated voltage. The auxiliary activating module 120 is operable to generate a constant duty cycle signal and output the constant duty cycle signal in a predetermined period. The drive module 130 is operable to receive the electrical level regulated voltage and the constant duty cycle signal to control a motor 142 and further drive the fan 140 according to the electrical level regulated voltage and the constant duty cycle signal.

Specifically, the drive module 130 includes a pulse generating unit 132, a rotational speed control unit 134, and a drive unit 136. The pulse generating unit 132 is operable to generate a triangle wave. The rotational speed control unit 134 is operable to receive the electrical level regulated voltage and the triangle wave and compare the electrical level regulated voltage and the triangle wave to generate a pulse width modulation control signal. The drive unit 136 is operable to receive the pulse width modulation control signal and the constant duty cycle signal to control the motor 142 and further drive the fan 140.

According to the principle and the spirit of the present invention, the auxiliary activating module 120 can output the constant duty cycle signal in the predetermined period when the motor 142 is activated, wherein the duty cycle and the predetermined period can be set according to an actual demand. As such, when the motor 142 is activated, the pulse width modulation control signal outputted from the rotational speed control unit 134 and the constant duty cycle signal outputted from the auxiliary activating module 120 can be provided to the drive unit 136 to help motor 142 activate and further drive the fan 140. After the motor 142 is activated, the rotational speed control unit 134 outputs the control signal to the drive unit 136 for controlling the motor 142 and further driving the fan 140.

In addition, with the use of the auxiliary activating module 120, there is no need to drive the motor 142 in a high rotational speed when the motor 142 is activated, and the motor 142 is switched to a low rotational speed after the motor 142 is activated so as to improve the large noise when the motor 142 is activated.

Furthermore, the voltage regulating module 110 includes a plurality of voltage regulating units V~VRnm, wherein the voltage regulating units VR11~VRnm are operable to receive the voltage and perform a regulation process to the voltage to generate a plurality of electrical level regulated voltages. The rotational speed control unit 134 is operable to receive the electrical level regulated voltages and the triangle wave and compare the electrical level regulated voltages and the triangle wave to generate the pulse width modulation control signal.

As such, with the use of the voltage regulating module 110, the pulse generating unit 132, and the rotational speed control unit 134, the voltage regulating module 110 can provide different voltage levels and compare the voltage levels with the triangle wave to generate the pulse width modulation control signal with different duty cycles. There is no need to connect the motor control system 100 with additional resistors in series to improve the power consumption due to cascade resistor, the reduction of voltage provided to IC because of resistors connected in series so as to fail in conforming to the standards of the IC, and insufficient energy outputted from the IC owing to the drop of the voltage so as to fail in activating the motor.

For example, each of the voltage regulating units VR11~VRnm can be a voltage division circuit, and the voltage regulating units VR11~VRnm can be disposed according to the actual demand of the circuit to generate a voltage division. In addition, the auxiliary activating module 120 can be a voltage regulating module, and the auxiliary activating module 120 can output the constant duty cycle signal according to the actual demand of the circuit. Furthermore, the rotational speed control unit 134 can be a comparator for receiving a plurality of electrical level regulated voltages and comparing the electrical level regulated voltages with the triangle wave to generate the pulse width modulation control signal with different duty cycles according to the compared result.

Figure 2:
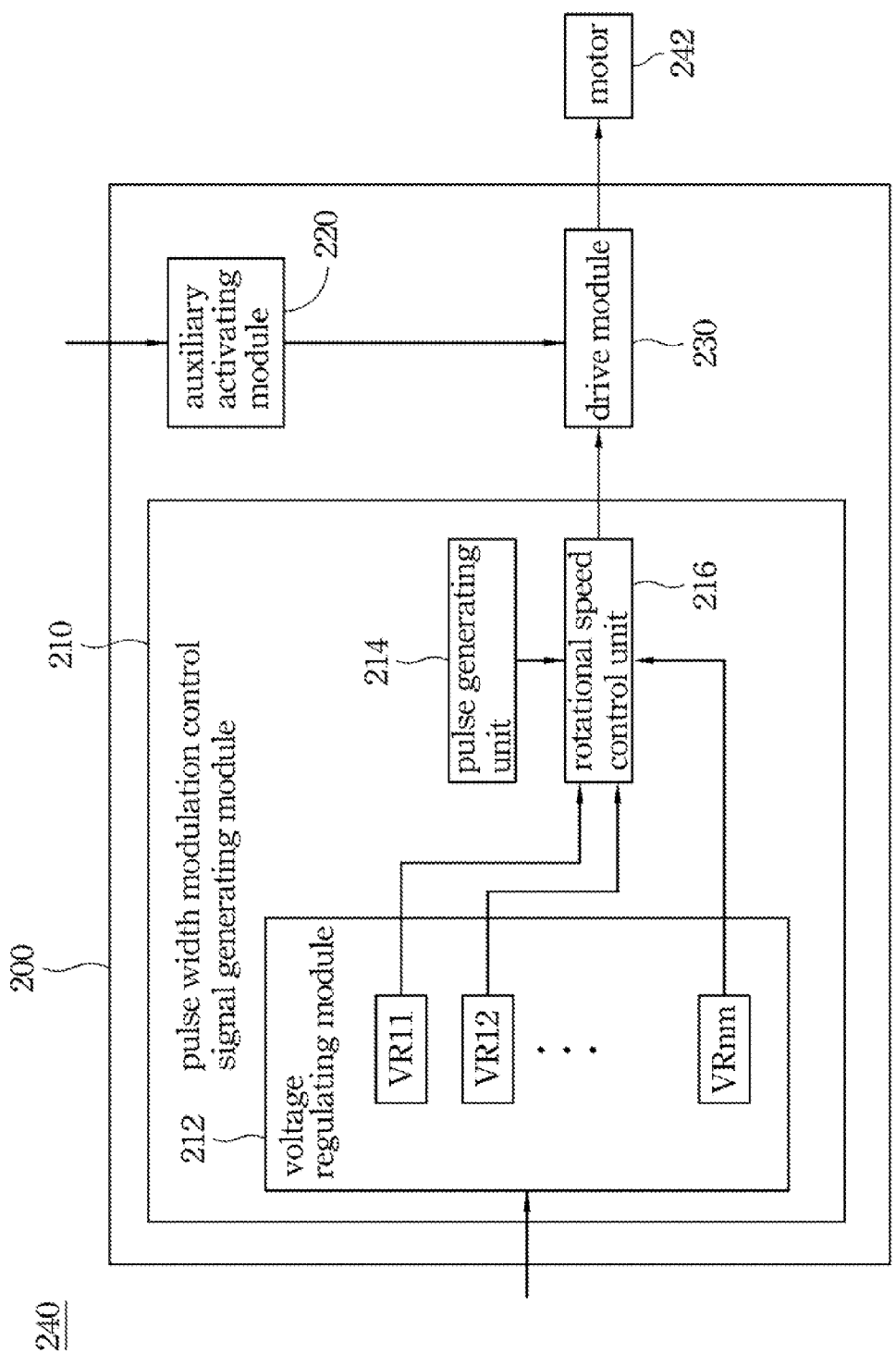
FIG. 2 schematically shows a circuit diagram of a fan including a motor control system according to a second embodiment of the present invention.

FIG. 2 schematically shows a circuit diagram of a fan including a motor control system 200 according to a second embodiment of the present invention. As shown in FIG. 2, the motor control system 200 includes a pulse width modulation control signal generating module 210, an auxiliary activating module 220, and a drive module 230. In operation, the pulse width modulation control signal generating module 210 is operable to generate a pulse width modulation control signal. The auxiliary activating module 220 is operable to generate a constant duty cycle signal and output the constant duty cycle signal in a predetermined period. The drive module 230 is operable to receive the pulse width modulation control signal and the constant duty cycle signal to control a motor 242 and further drive the fan 240 according to the pulse width modulation control signal and the constant duty cycle signal.

Specifically, the pulse width modulation control signal generating module 210 includes a voltage regulating module 212, a pulse generating unit 214, and a rotational speed control unit 216. The voltage regulating module 212 is operable to receive a voltage and perform a regulation process to the voltage to generate an electrical level regulated voltage. The pulse generating unit 214 is operable to generate a triangle wave. The rotational speed control unit 216 is operable to receive the electrical level regulated voltage and the triangle wave and compare the electrical level regulated voltage and the triangle wave to generate the pulse width modulation control signal.

According to the principle and the spirit of the present invention, the auxiliary activating module 220 can output the constant duty cycle signal in the predetermined period when the motor 142 is activated, wherein the duty cycle and the predetermined period can be set according to an actual demand. As such, when the motor 242 is activated, the pulse width modulation control signal outputted from the rotational speed control unit 216 and the constant duty cycle signal outputted from the auxiliary activating module 220 can be provided to the drive module 230 to help motor 242 activate and further drive the fan 240. After the motor 242 is activated, the rotational speed control unit 216 outputs the control signal to the drive module 230 for controlling the motor 242 and further driving the fan 240.

In addition, with the use of the auxiliary activating module 220, there is no need to drive the motor 242 in a high rotational speed when the motor 242 is activated and switching the motor 242 to a low rotational speed after the motor 242 is activated so as to improve the large noise when the motor 242 is activated.

Moreover, the voltage regulating module 212 includes a plurality of voltage regulating units VR11~VRnm, wherein the voltage regulating units VR11~VRnm are operable to receive the voltage and perform a regulation process to the voltage to generate a plurality of electrical level regulated voltages; wherein rotational speed control unit 216 is operable to receive the electrical level regulated voltages and the triangle wave and compare the electrical level regulated voltages and the triangle wave to generate the pulse width modulation control signal.

As such, with the use of the voltage regulating module 212, the pulse generating unit 214, and the rotational speed control unit 216, the voltage regulating module 212 can provide different voltage levels and compare the voltage levels with the triangle wave to generate the pulse width modulation control signal with different duty cycles. There is no need to connect the motor control system 200 with an additional resistor in series to improve the power consumption due to cascade resistor, the reduction of voltage provided to IC because of resistors connected in series so as to fail in conforming to the standards of the IC, and insufficient energy outputted from the IC owing to the drop of the voltage so as to fail in activating the motor.

For example, each of the voltage regulating units VR11~VRnm can be a voltage division circuit, and the voltage regulating units VR11~VRnm can be disposed according to the actual demand of the circuit to generate a voltage division. In addition, the auxiliary activating module 220 can be a voltage regulating module, and the auxiliary activating module 220 can output the constant duty cycle signal according to the actual demand of the circuit. Furthermore, the rotational speed control unit 216 can be a comparator for receiving a plurality of electrical level regulated voltages and comparing the electrical level regulated voltages with the triangle wave to generate the pulse width modulation control signal with different duty cycles according to the compared result.

Figure 3A:
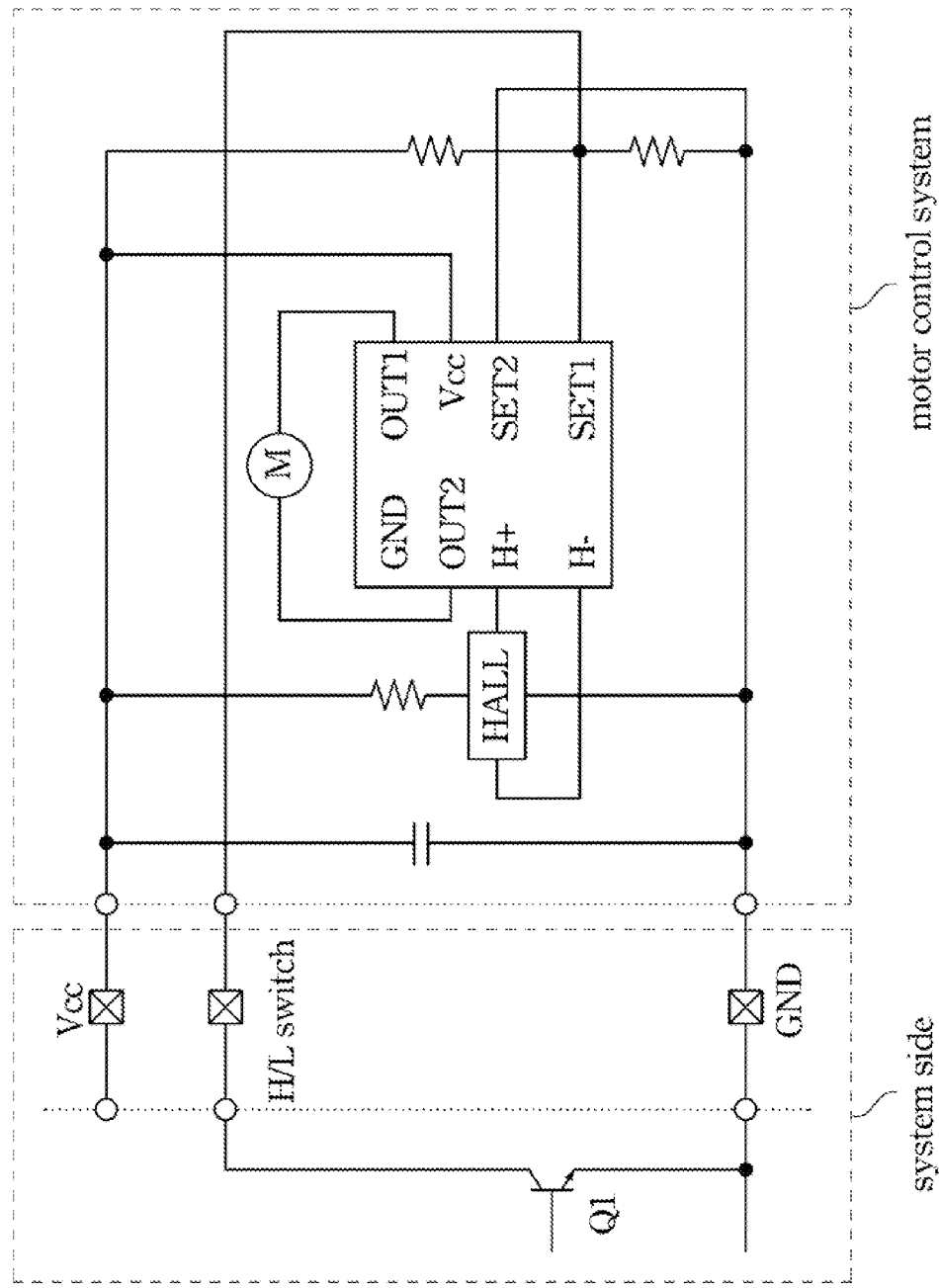
FIG. 3A schematically shows a circuit diagram of a motor control system according to a third embodiment of the present invention.
Figure 3B:
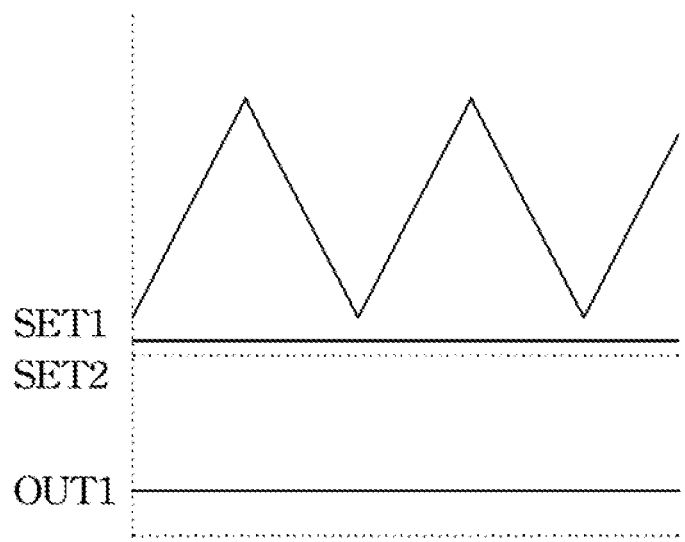
FIGS. 3B and 3C schematically show waveform diagrams of the motor control system according to FIG. 3A.
Figure 3C:
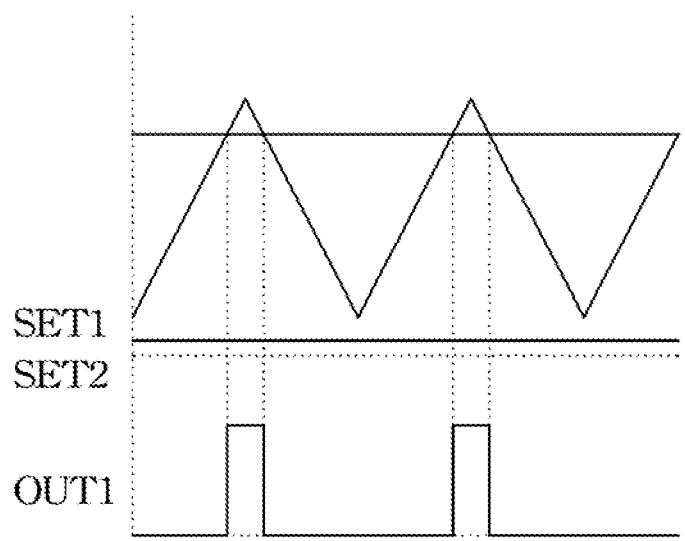

FIG. 3A schematically shows a circuit diagram of a motor control system according to a third embodiment of the present invention. FIGS. 3B and 3C schematically show waveform diagrams of the motor control system according to FIG. 3A.

It is noteworthy that the corresponding relationship between the circuit block of FIGS. 1 to 2 and the circuit diagram (FIG. 3A to 7A) as shown below has to be stated. First of all, the voltage regulating module 110 or 212 is corresponding to the power switch (Q1, Q2) in the circuit diagram and the voltage division circuit. Next, no matter a single element or an integrated module thereof using the following elements: the pulse generating unit 132 or 214, the rotational speed control unit 134 or 216, the drive unit 136 or drive module 230, and auxiliary activating module 120 or 220 is included in the IC of FIG. 3A to 7A. Furthermore, the IC with 8 pins as shown in FIG. 3A is regarded as an example, and the present invention is not limited to the IC with 8 pins. Other type of the IC, for example, the IC with 10 pins, 12 pins, 16 pins, and so on, can be implemented in the present invention.

As shown in FIG. 3B, the SET1 voltage is grounded when the power switch Q1 is turned on. At this time, the SET1 voltage is equal to the SET2 voltage; that is to say, the SET1 voltage and the SET2 voltage are in the same voltage level. As shown in the figure, the SET1 voltage level and the SET2 voltage level are below the triangle wave. The OUT1 terminal of the IC will output the pulse width modulation control signal with 100% duty cycle after the triangle wave and the SET1 voltage level and SET2 voltage level are compared so as to drive the motor in a full speed. It is noteworthy that the OUT1 of FIGS. 3B and 3C is outputted from the OUT1 terminal of the IC in FIG. 3A.

Reference is now made to FIG. 3C, the SET1 voltage level is higher than the SET2 voltage level when the power switch Q1 is not turned on. It is noteworthy that the one with higher voltage level is set to be the comparison basis for comparing with the triangle wave in the embodiment of the present invention; however, the scope of the present application is not intended to be limited to the embodiment, it should be understood by those skilled in the art that the comparison basis can be set according to the actual demand, for example, the one with lower voltage level can be set to be the comparison basis.

As shown above, please refer to FIG. 3C, the OUT1 terminal of the IC will output the pulse width modulation control signal with 20% duty cycle after the triangle wave and the SET1 voltage level are compared so as to drive the motor in a half speed.

Figure 4A:
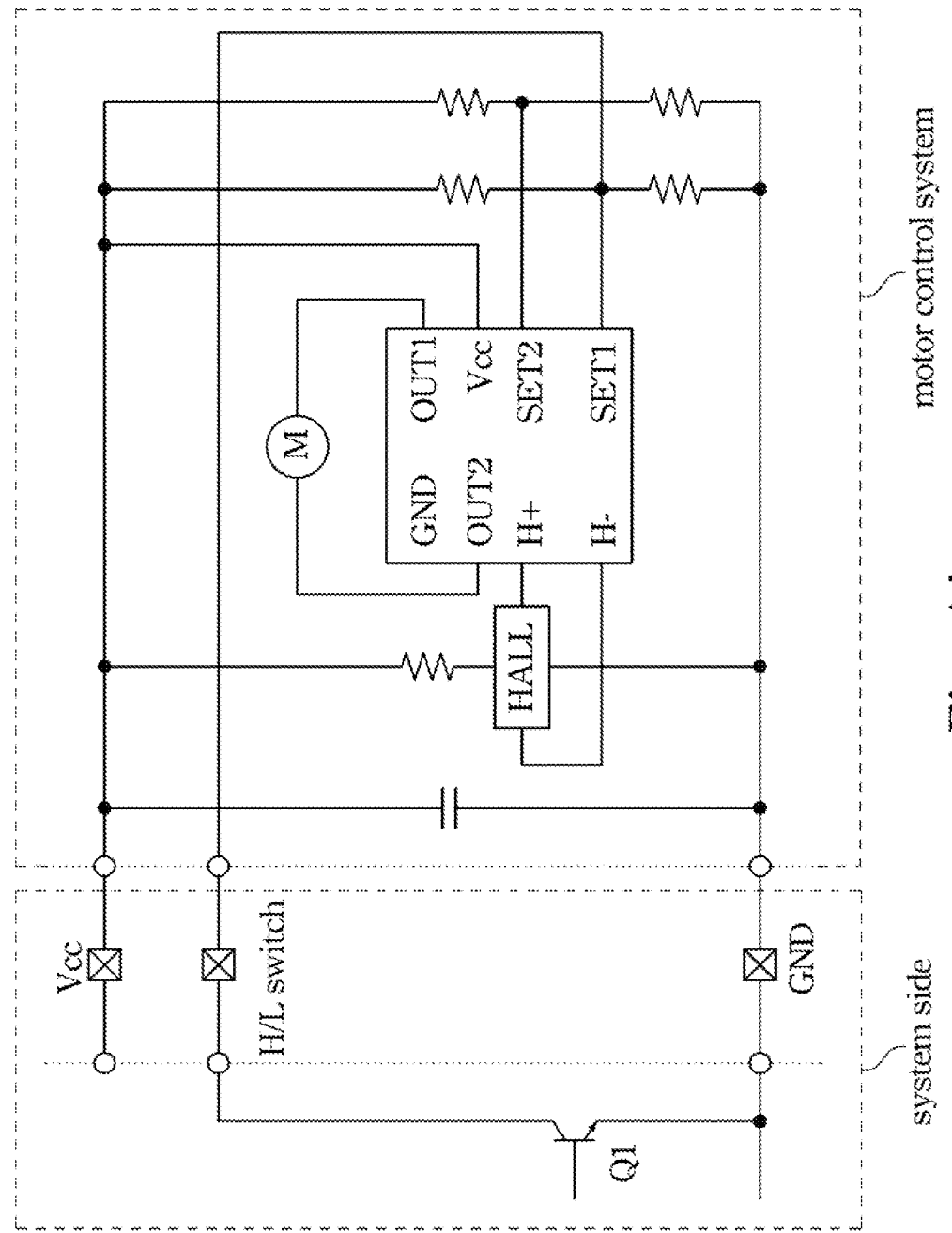
FIG. 4A schematically shows a circuit diagram of a motor control system according to a fourth embodiment of the present invention.
Figure 4B:
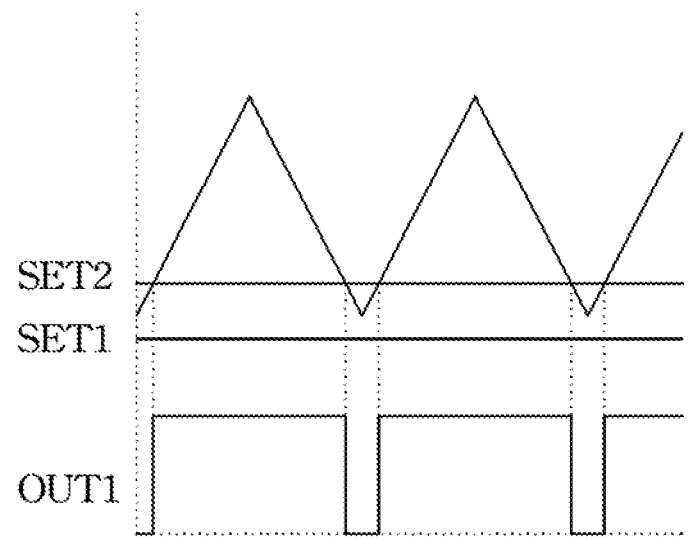
FIGS. 4B and 4C schematically show waveform diagrams of the motor control system according to FIG. 4A.
Figure 4C:
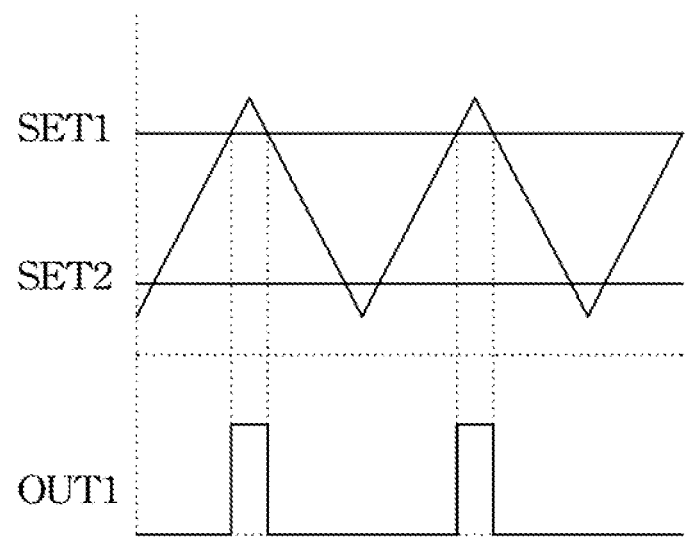

FIG. 4A schematically shows a circuit diagram of a motor control system according to a fourth embodiment of the present invention. FIGS. 4B and 4C schematically show waveform diagrams of the motor control system according to FIG. 4A.

As shown in FIG. 4B, the SET1 voltage is grounded when the power switch Q1 is turned on. At this time, the SET2 voltage level is higher than the SET1 voltage level. As mentioned above, The OUT1 terminal of the IC will output the pulse width modulation control signal with A duty cycle after the triangle wave and the SET2 voltage level are compared so as to drive the motor with a first segment rotational speed. It is noteworthy that the OUT1 of FIGS. 4B and 4C is outputted from the OUT1 terminal of the IC in FIG. 4A.

Reference is now made to FIG. 4C, the SET1 voltage level is higher than the SET2 voltage level when the power switch Q1 is not turned on. As mentioned above, The OUT1 terminal of the IC will output the pulse width modulation control signal with B duty cycle after the triangle wave and the SET1 voltage level are compared so as to drive the motor with a second segment rotational speed.

As such, the control mode of power switch (Q1) of the motor control system in FIGS. 3A and 4A can control the motor to operate with two kinds of the rotational speeds such as the full speed and the half speed as shown in FIG. 3A, and the first segment rotational speed and the second segment rotational speed as shown in FIG. 4A.

Figure 5A:
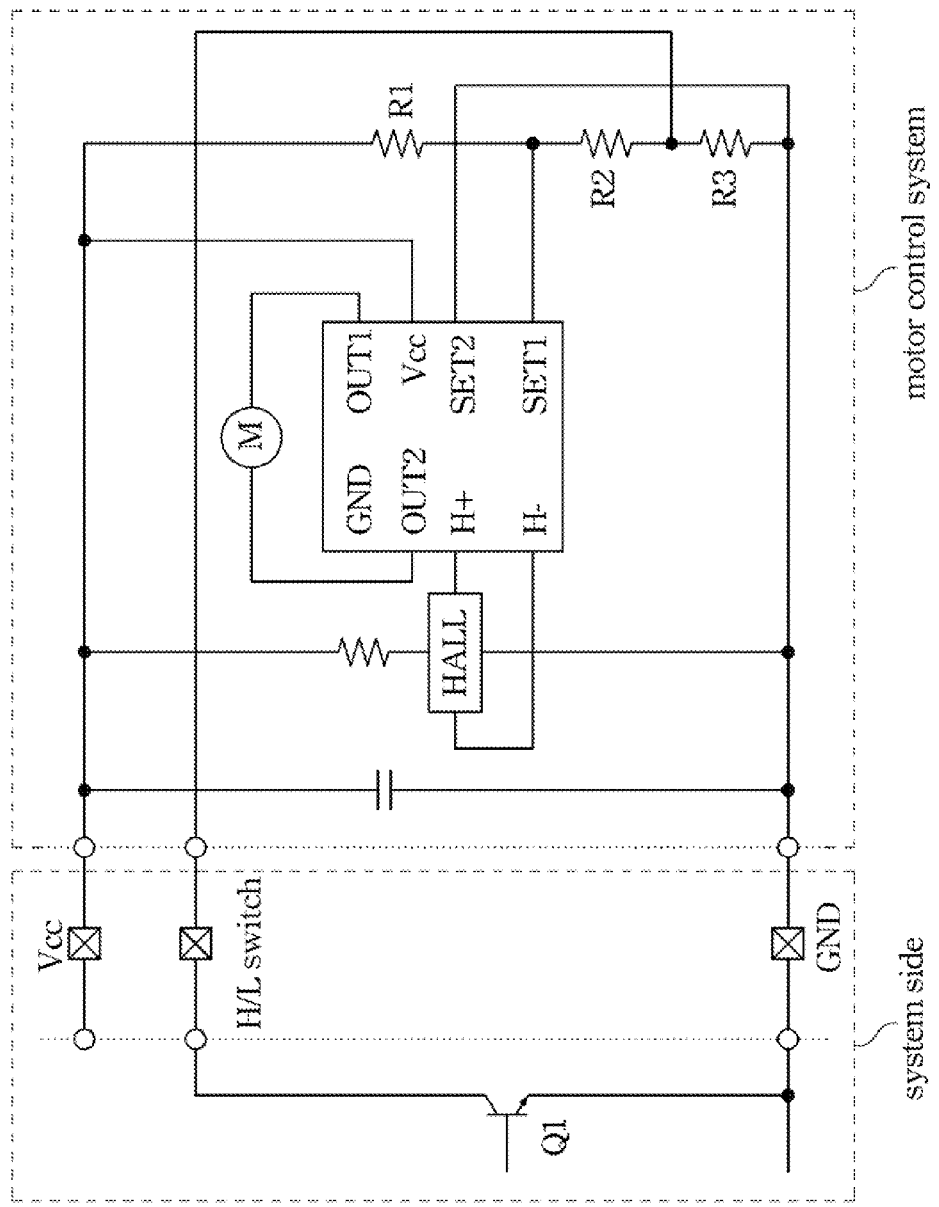
FIG. 5A schematically shows a circuit diagram of a motor control system according to a fifth embodiment of the present invention.
Figure 5B:
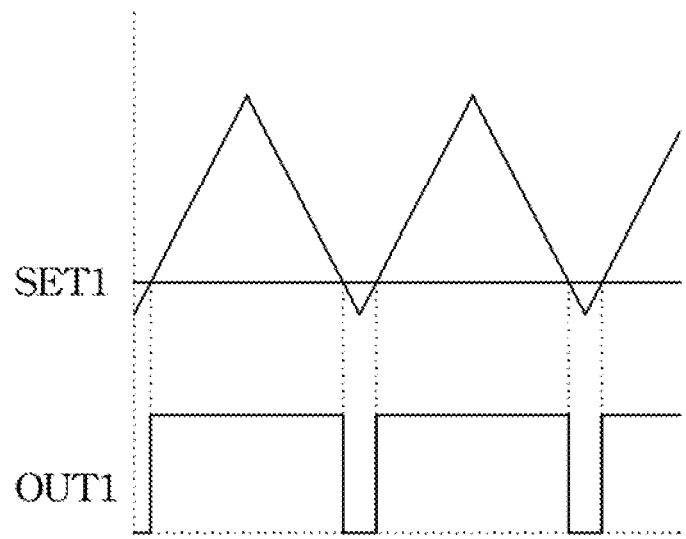
FIGS. 5B and 5C schematically show waveform diagrams of the motor control system according to FIG. 5A.
Figure 5C:
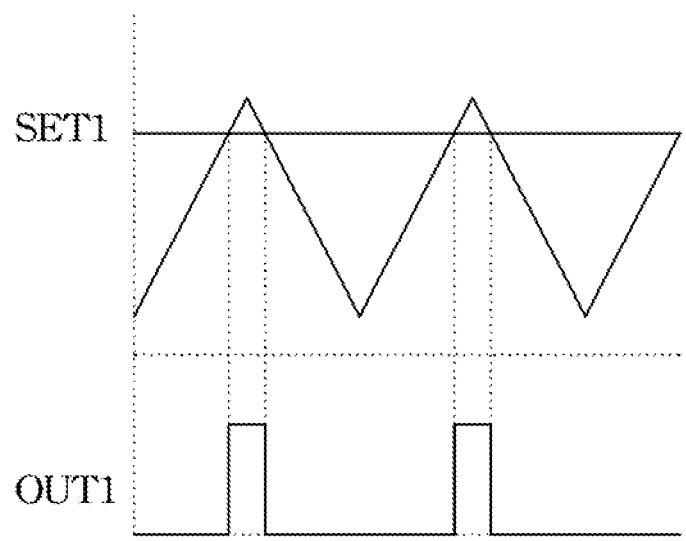

FIG. 5A schematically shows a circuit diagram of a motor control system according to a fifth embodiment of the present invention. FIGS. 5B and 5C schematically show waveform diagrams of the motor control system according to FIG. 5A.

As shown in FIG. 5B, the R1 and the R2 will divide the voltage to generate a first division voltage when the power switch Q1 is turned on, and the first division voltage is the SET1 voltage level. At this time, the SET2 voltage is grounded as shown in the figure, and the SET1 voltage level is higher than the SET2 voltage level. The OUT1 terminal of the IC will output the pulse width modulation control signal with A duty cycle after the triangle wave and the SET1 voltage level are compared so as to drive the motor with a first segment rotational speed. It is noteworthy that the OUT1 of FIGS. 5B and 5C is outputted from the OUT1 terminal of the IC in FIG. 5A.

Reference is now made to FIG. 5C, the R1 and the R2+R3 will divide the voltage to generate a second division voltage when the power switch Q1 is not turned on, and the second division voltage is the SET1 voltage level. At this time, the SET2 voltage is grounded as shown in the figure, and the SET1 voltage level is higher than the SET2 voltage level. The OUT1 terminal of the icy IC will output the pulse width modulation control signal with B duty cycle after the triangle wave and the SET1 voltage level are compared so as to drive the motor with a second segment rotational speed.

Reference is now made to both FIGS. 5B and 5C, the SET1 voltage level in FIG. 5C is the second division voltage, and the SET1 voltage level in FIG. 5C is higher than the SET1 voltage level in FIG. 5B (the first division voltage), As such, the OUT1 of the IC outputs two kinds of the rotational speeds (the first segment rotational speed and the second segment rotational speed) after the first division voltage and the second division voltage are compared with the triangle wave respectively.

Figure 6A:
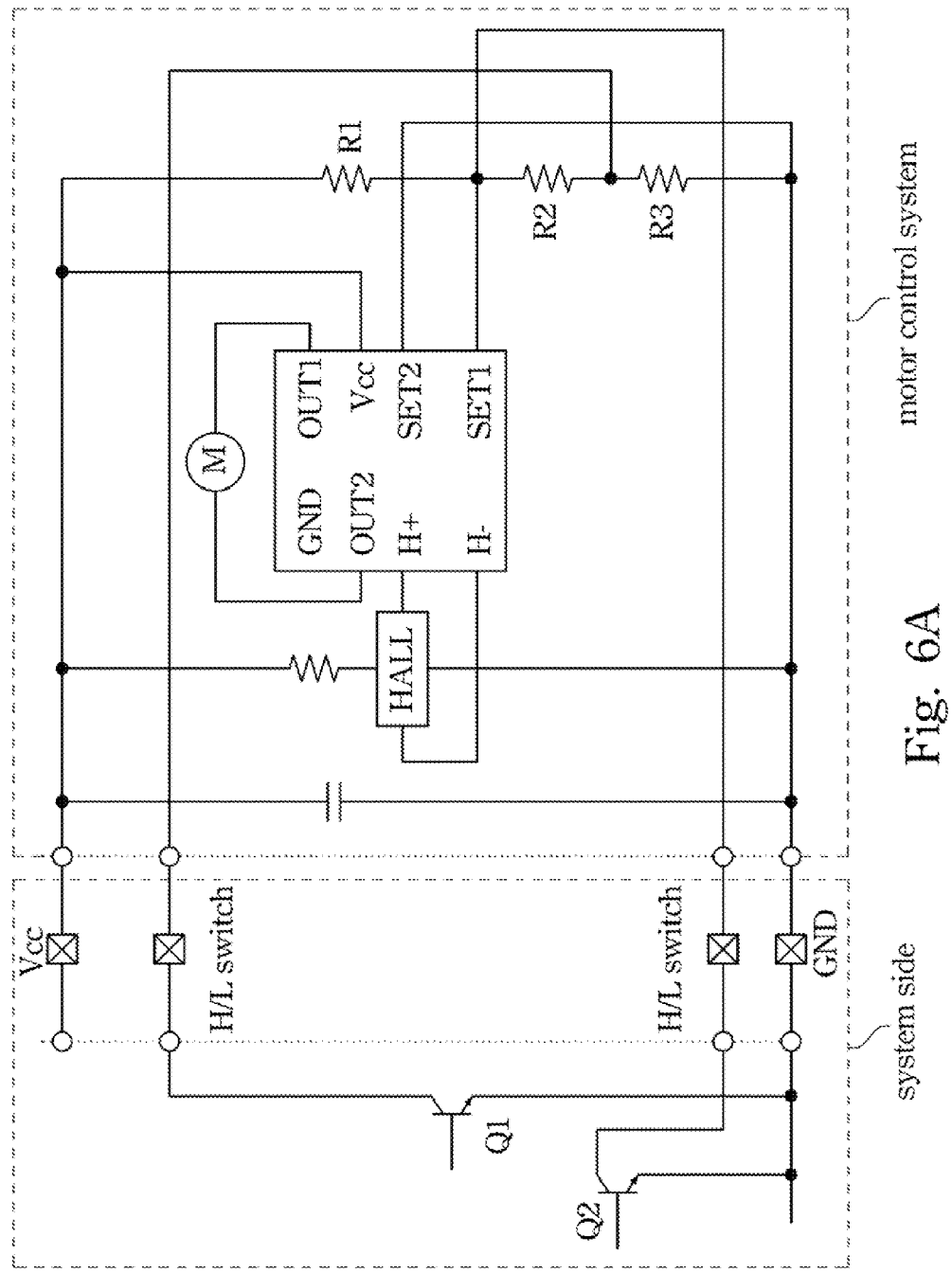
FIG. 6A schematically shows a circuit diagram of a motor control system according to a sixth embodiment of the present invention.
Figure 6B:
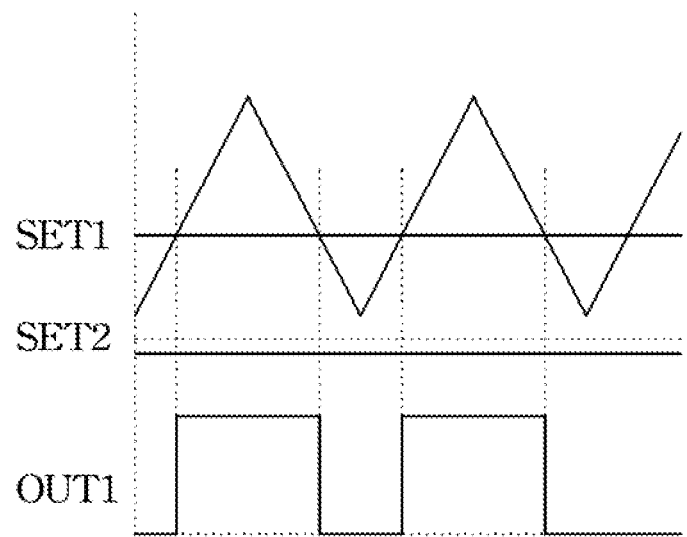
FIGS. 6B, 6C, and 6D schematically show waveform diagrams of the motor control system according to FIG. 6A.
Figure 6C:
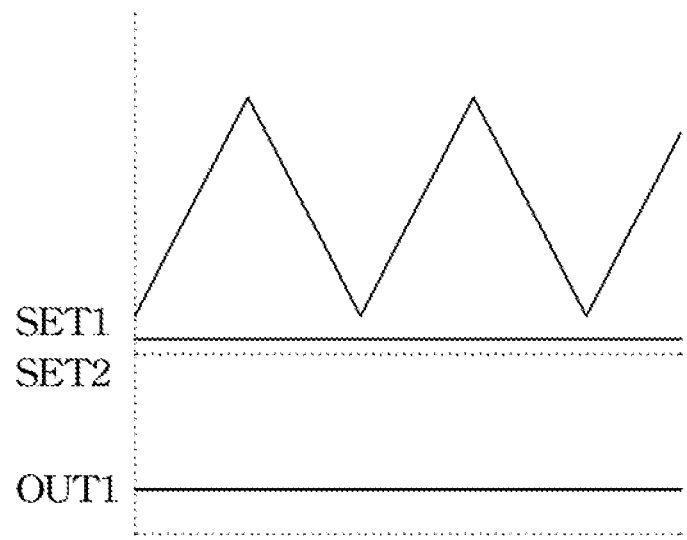
Figure 6D:
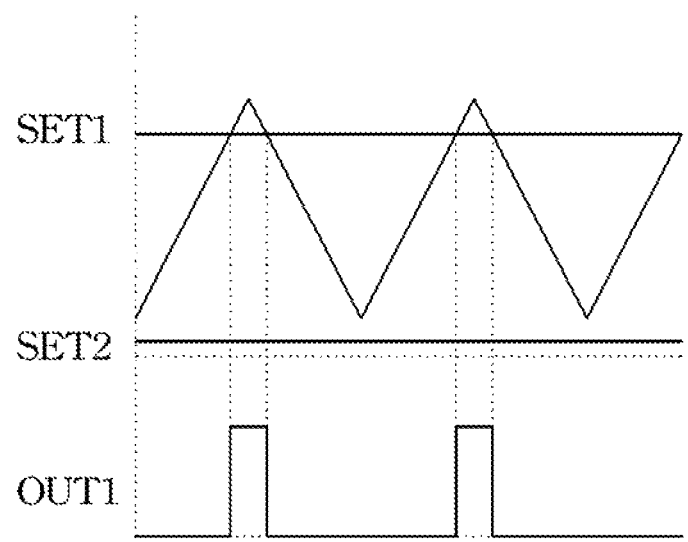

FIG. 6A schematically shows a circuit diagram of a motor control system according to a sixth embodiment of the present invention. FIGS. 6B, 6C, and 6D schematically show waveform diagrams of the motor control system according to FIG. 6A.

As shown in FIG. 6B, the R1 and the R2 will divide the voltage to generate a first division voltage when the power switch Q1 is turned on and the power switch Q2 is not turned on, and the first division voltage is the SET1 voltage level. The SET1 voltage level is higher than the SET2 voltage level as shown in the figure. The OUT1 terminal of the IC will output the pulse width modulation control signal with A duty cycle after the triangle wave and the SET1 voltage level are compared so as to drive the motor a the first segment rotational speed. It is noteworthy that the OUT1 of FIGS. 6B, 6C, and 6D is outputted from the OUT1 terminal of the IC in FIG. 6A.

Reference is now made to FIG. 6C, the SET1 voltage is grounded when the power switch Q1 is not turned on and the power switch Q2 is turned on. At this time, the SET1 voltage is equal to the SET2 voltage; that is to say, the SET1 voltage and the SET2 voltage are in the same voltage level. As shown in the figure, the SET1 voltage level and the SET2 voltage level are below the triangle wave. The OUT1 terminal of the IC will output the pulse width modulation control signal with 100% duty cycle after the triangle wave and the SET1 voltage level and SET2 voltage level are compared so as to drive the motor in a full speed.

Reference is now made to FIG. 6D, the R1 and the R2+R3 will divide the voltage to generate a second division voltage when the power switch Q1 is not turned on and the power switch Q2 is not turned on. The SET1 voltage level is higher than the SET2 voltage level as shown in the figure. The OUT1 terminal of the IC will output the pulse width modulation control signal with F duty cycle after the triangle wave and the SET1 voltage level are compared so as to drive the motor with a second segment rotational speed.

The SET1 voltage is grounded when the power switch Q1 is not turned on and the power switch Q2 is not turned on. At this time, the SET1 voltage is equal to the SET2 voltage; that is to say, the SET1 voltage and the SET2 voltage are in the same voltage level. As shown in the figure, the SET1 voltage and the SET2 voltage level are below the triangle wave. The OUT1 terminal of the IC will output the pulse width modulation control signal with 100% % duty cycle after the triangle wave and the SET1 voltage level and SET2 voltage level are compared so as to drive the motor in a full speed. The control mode herein has been described hereinabove in connection with FIG. 6C, and accordingly, a detailed description regarding the present invention is omitted herein for the sake of brevity.

As such, the control mode of power switch (Q1 and Q2) of the motor control system in FIG. 6A can control the motor to operate with three kinds of the rotational speeds such as the first segment rotational speed, the second segment rotational speed, and the full speed.

Figure 7A:
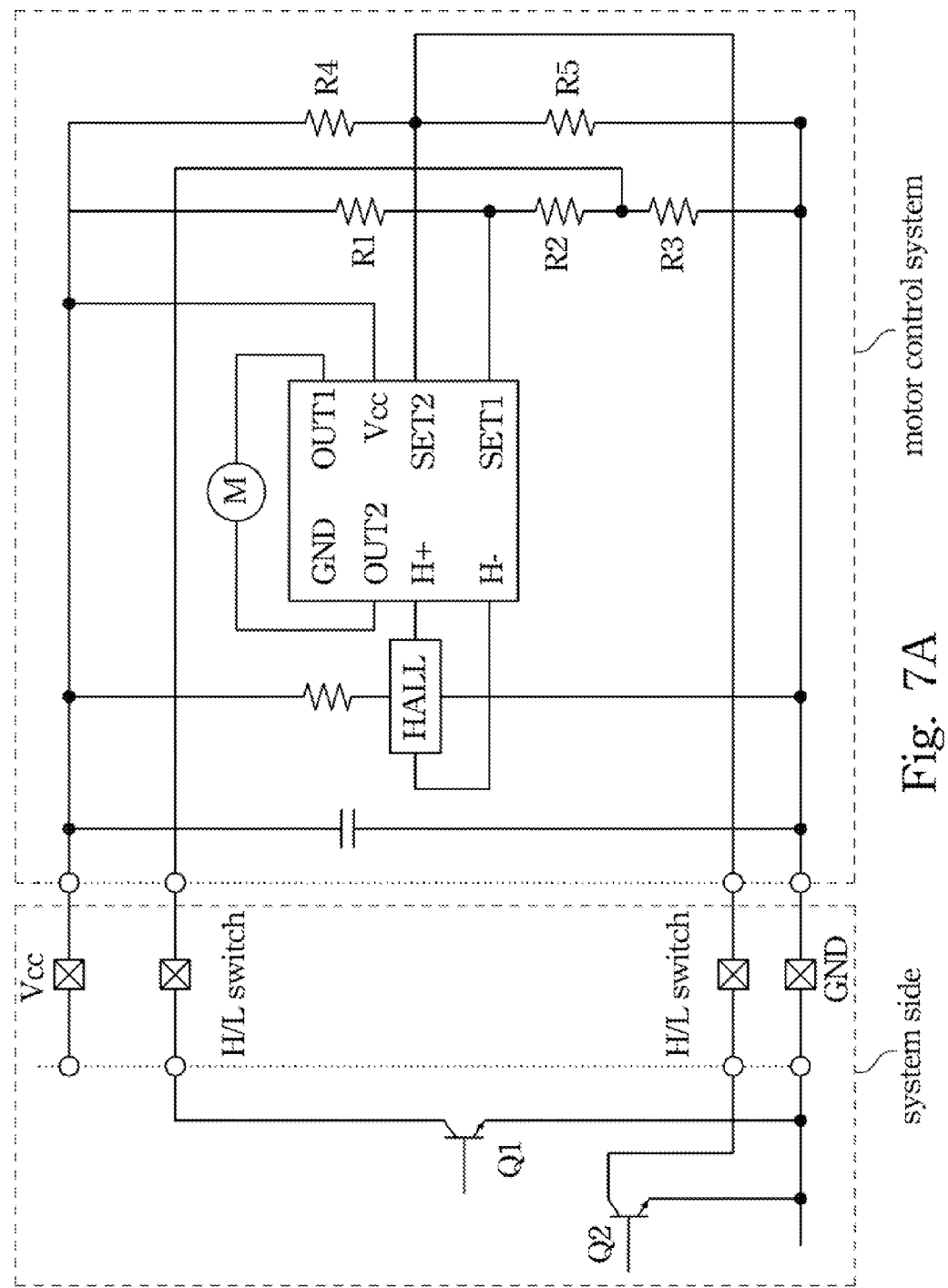
FIG. 7A schematically shows a circuit diagram of a motor control system according to a seventh embodiment of the present invention.

FIG. 7A schematically shows a circuit diagram of a motor control system according to a seventh embodiment of the present invention. FIGS. 7B, 7C, 7D, and 7E schematically show waveform diagrams of the motor control system according to FIG. 7A.

Figure 7B:
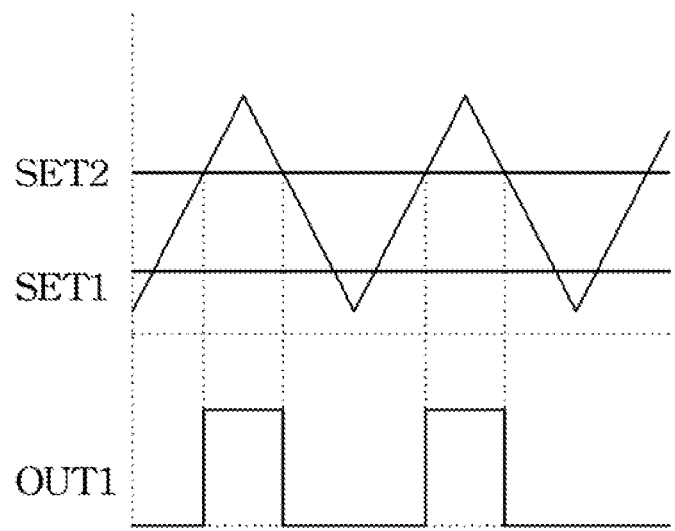
FIGS. 7B, 7C, 7D, and 7E schematically show waveform diagrams of the motor control system according to FIG. 7A.

As shown in FIG. 7B, the R1 and the R2 will divide the voltage to generate a first division voltage, and the R4 and the R5 will divide the voltage to generate a second division voltage when the power switch Q1 is turned on, and the power switch Q2 is not turned on. If the second division voltage is higher than the first division voltage, the SET2 voltage level is higher than the SET1 voltage level as shown in the figure. The OUT1 terminal of the IC will output the pulse width modulation control signal with A duty cycle after the triangle wave and the SET2 voltage level are compared so as to drive the motor with a first segment rotational speed. It is noteworthy that the OUT1 of FIGS. 7B, 7C, 7D, and 7E is outputted from the OUT1 terminal of the IC in FIG. 7A.

Figure 7C:
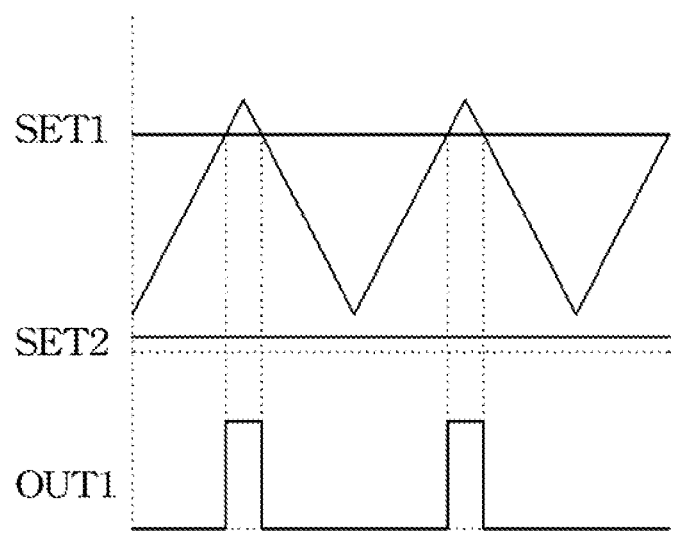

Reference is now made to FIG. 7C, the R1 and the R2+R3 will divide the voltage to generate a third division voltage when the power switch Q1 is not turned on and the power switch Q2 is turned on, and the third division voltage is the SET1 voltage level. The OUT1 terminal of the IC will output the pulse width modulation control signal with B duty cycle after the triangle wave and the SET1 voltage level are compared so as to drive the motor with a second segment rotational speed as shown in the figure.

Figure 7D:
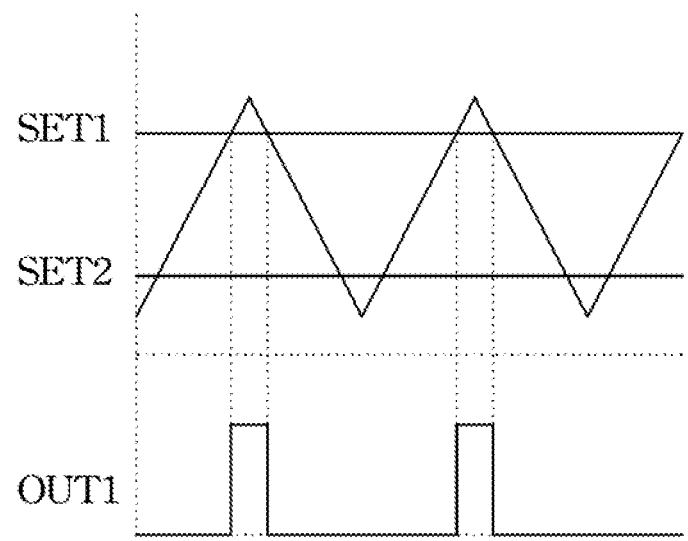

Reference is now made to FIG. 7D, the R1 and the R2+R3 will divide the voltage to generate the third division voltage, and the R4 and the R5 will divide the voltage to generate the second division voltage when the power switch Q1 is not turned on and the power switch Q2 is not turned on. The third division voltage is the SET1 voltage level, and the second division voltage is the SET2 voltage level. The SET1 voltage level is higher than the SET2 voltage level as shown in the figure. The OUT1 terminal of the IC will output the pulse width modulation control signal with C duty cycle after the triangle wave and the SET1 voltage level are compared so as to drive the motor with a third segment rotational speed.

Figure 7E:
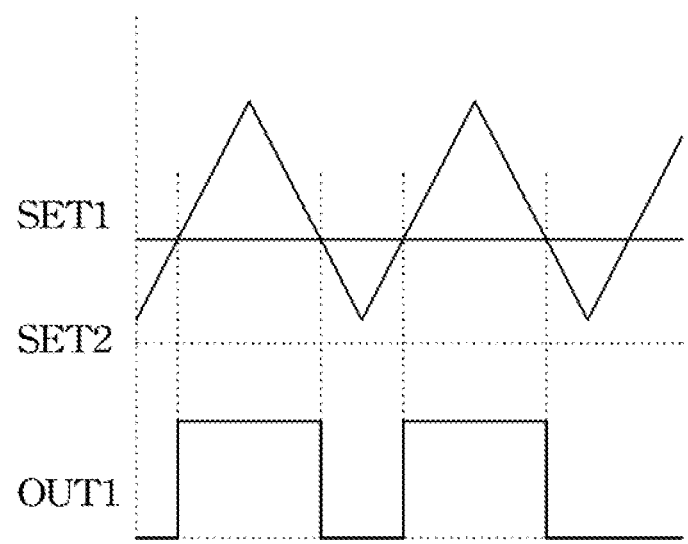

Reference is now made to FIG. 7E, the R1 and the R2 will divide the voltage to generate the first division voltage when the power switch Q1 is turned on and the power switch Q2 is turned on, and the first division voltage is the SET1 voltage level. The SET1 voltage level is higher than the SET2 voltage level as shown in the figure. The OUT1 terminal of the IC will output the pulse width modulation control signal with D duty cycle after the triangle wave and the SET1 voltage level are compared so as to drive the motor with a fourth segment rotational speed.

As such, the control mode of power switch (Q1 and Q2) of the motor control system in FIG. 7A can control the motor to operate with four kinds of the rotational speeds such as the first segment rotational speed, the second segment rotational speed, the third segment rotational speed, and the fourth segment rotational speed.

As shown in FIG. 3A to 7E, the pulse width modulation control signal with different duty cycles can be generated by different circuit configurations (as the voltage regulating modules configured in FIGS. 1 to 4) and operation mode according to actual demand of the embodiment of the present invention to make the motor generate a plurality of rotational speeds. As a result, with the use of different circuit configurations (for example: voltage regulating module), the demand of a user for different motor rotational speeds can be satisfied without connecting a resistor with the motor control system.

The circuit configurations (for example: voltage regulating module) as shown in FIG. 3A to 7E are merely some exemplary embodiment to make the motor generate two to four kinds of rotational speeds; however, the scope of the present application is not intended to be limited to those embodiments, it should be understood by those skilled in the art that the motor can generate multi-segment rotational speeds by adopting different circuit configurations (for example: voltage regulating module).

In view of the foregoing embodiments of the present invention, many advantages of the present invention are now apparent. The embodiment of the present invention provides a motor control system. The motor control system is operable to improve the power consumption due to cascade resistor, and the reduction of voltage provided to IC because of resistors connected in series so as to fail in conforming to the standards of the IC. The motor control system is also operable to improve insufficient energy outputted from the IC owing to the drop of the voltage so as to fail in activating the motor, and the large noise when activating the motor by adopting multi-segment rotational speeds.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A motor control system, comprising:
a voltage regulating module for receiving a voltage and performing a regulation process to the voltage to generate an electrical level regulated voltage;
an auxiliary activating module for generating a constant duty cycle signal and outputting the constant duty cycle signal in a predetermined period when a motor is activated; and
a drive module for receiving the electrical level regulated voltage and the constant duty cycle signal to control the motor according to the electrical level regulated voltage and the constant duty cycle signal;
wherein the voltage regulating module comprises:
a plurality of voltage regulating units, wherein the voltage regulating units are operable to receive the voltage and perform the regulation process to the voltage to generate a plurality of electrical level regulated voltages;
wherein the drive module comprises:
a pulse generating unit for generating a triangle wave;
a rotational speed control circuit for receiving the electrical level regulated voltages and the triangle wave and comparing the electrical level regulated voltages and the triangle wave to generate a pulse width modulation control signal; and
a drive unit for receiving the pulse width modulation control signal from the rotational speed control circuit and the constant duty cycle signal directly from the auxiliary activating module to control the motor;
wherein the auxiliary activating module outputs the constant duty cycle signal in response to activation of the motor,
wherein the auxiliary activating module is directly coupled to the drive module,
wherein the pulse width modulation control signal outputted from the rotational speed control unit and the constant duty cycle signal outputted from the auxiliary activating module are provided to the drive unit to assist the motor in activating, wherein after the motor is activated, the auxiliary activating module stops outputting the constant duty cycle signal and the rotational speed control unit outputs the control signal to the drive unit for controlling the motor.

2. A fan, comprising:
a motor; and
a motor control system, comprising:
a voltage regulating module for receiving a voltage and performing a regulation process to the voltage to generate an electrical level regulated voltage;
an auxiliary activating module for generating a constant duty cycle signal and outputting the constant duty cycle signal in a predetermined period when the motor is activated; and
a drive module for receiving the electrical level regulated voltage and the constant duty cycle signal to control the motor according to the electrical level regulated voltage and the constant duty cycle signal;
wherein the voltage regulating module comprises:
a plurality of voltage regulating units, wherein the voltage regulating units are operable to receive the voltage and perform the regulation process to the voltage to generate a plurality of electrical level regulated voltages;
wherein the drive module comprises:
a pulse generating unit for generating a triangle wave;
a rotational speed control unit for receiving the electrical level regulated voltages and the triangle wave and comparing the electrical level regulated voltages and the triangle wave to generate a pulse width modulation control signal; and
a drive unit for receiving the pulse width modulation control signal from the rotational speed control unit and the constant duty cycle signal directly from the auxiliary activating module to control the motor;
wherein the auxiliary activating module outputs the constant duty cycle signal in response to activation of the motor,
wherein the auxiliary activating module is directly coupled to the drive module,
wherein the pulse width modulation control signal outputted from the rotational speed control unit and the constant duty cycle signal outputted from the auxiliary activating module are provided to the drive unit to assist the motor in activating, wherein after the motor is activated, the auxiliary activating module stops outputting the constant duty cycle signal and the rotational speed control unit outputs the control signal to the drive unit for controlling the motor.

3. A motor control system, comprising:
a pulse width modulation control signal generating module for generating a pulse width modulation control signal;
wherein the pulse width modulation control signal generating module comprises:
a voltage regulating module, wherein the voltage regulating module comprises:

a plurality of voltage regulating units, wherein the voltage regulating units are operable to receive a voltage and perform a regulation process to the voltage to generate a plurality of electrical level regulated voltages;

a pulse generating unit for generating a triangle wave; and a rotational speed control unit for receiving the electrical level regulated voltages and the triangle wave and comparing the electrical level regulated voltages and the triangle wave to generate the pulse width modulation control signal;

an auxiliary activating module for generating a constant duty cycle signal and outputting the constant duty cycle signal in a predetermined period when a motor is activated; and a drive module for receiving the pulse width modulation control signal and the constant duty cycle signal to control the motor according to the pulse width modulation control signal from the pulse width modulation control signal generating module and the constant duty cycle signal directly from the auxiliary activating module;

wherein the auxiliary activating module outputs the constant duty cycle signal in response to activation of the motor, wherein the auxiliary activating module is directly coupled to the drive module, wherein the pulse width modulation control signal outputted from the rotational speed control unit and the constant duty cycle signal outputted from the auxiliary activating module are provided to the drive module to assist the motor in activating, wherein after the motor is activated, the auxiliary activating module stops outputting the constant duty cycle signal and the rotational speed control unit outputs the control signal to the drive module for controlling the motor.

4. The motor control system according to claim 3, wherein the motor control system is applied to a fan which comprises a motor.

\* \* \* \* \*